March 23, 1971 D. K. TASHIRO 3,572,170
CLUTCH-BRAKE OPERATOR FOR FORWARD-REVERSE PLANET GEARS
Filed Oct. 1, 1969 2 Sheets-Sheet 1

INVENTOR
DONALD K. TASHIRO
BY Neal C. Johnson
ATT'Y.

March 23, 1971  D. K. TASHIRO  3,572,170
CLUTCH-BRAKE OPERATOR FOR FORWARD-REVERSE PLANET GEARS
Filed Oct. 1, 1969  2 Sheets-Sheet 2

INVENTOR
DONALD K. TASHIRO
BY Neal C. Johnson
ATT'Y.

United States Patent Office 3,572,170
Patented Mar. 23, 1971

3,572,170
CLUTCH-BRAKE OPERATOR FOR FORWARD-REVERSE PLANET GEARS
Donald K. Tashiro, Hamilton, Ontario, Canada, assignor to International Harvester Company, Chicago, Ill.
Filed Oct. 1, 1969, Ser. No. 862,854
Int. Cl. F16d 67/02
U.S. Cl. 74—792                                        6 Claims

ABSTRACT OF THE DISCLOSURE

A control system for the conventional planetary gear transmission of a self-propelled agricultural vehicle wherein the clutch and brake assemblies of the transmission are operable to incur forward-neutral-reverse drive in response to movement of a control lever accessible to the operator. A control member is arranged to move axially in response to rotation thereof about the power input shaft to disengage the clutch assembly and thus incur neutral drive. Continued rotation of the control member actuates the brake assembly to incur reverse drive without further significant axial movement of the control member, thereby preventing overloading of the clutch assembly.

BACKGROUND OF THE INVENTION

(1) Field of the invention

The invention relates generally to controls for power transmissions and more particularly to an improved control mechanism for a planetary gear type transmission adapted for driving a drive wheel of a self-propelled windrower.

(2) Prior art

Agricultural vehicles such as self-propelled windrowers commonly are driven and controlled through a pair of planetary gear type transmissions arranged to drive the respective drive wheels of the machine. Each planetary transmission includes a clutch assembly and a brake assembly operable to effect forward-neutral-reverse drive of the transmission in response to movement of a control lever accessible to the operator. Conventional control systems are characterized by the complexity of the linkage means interconnecting the control lever and the clutch and brake assemblies of the transmission. Moreover, the clutch assembly includes components which are actuated against the force of the springs within the clutch assembly. A problem is to design the control system so as to be operable against the force of the clutch springs and yet require a minimum of effort on the part of the operator. The complexity of conventional control mechanisms also requires that the same be frequently and carefully adjusted so that the operation of the vehicle is responsive to the controls.

One approach is to redesign the transmission so that clutch springs are eliminated entirely as shown for example in U.S. Pat. No. 3,133,455. The overall costs of designing a different type of transmission may be substantial however.

A further problem associated with planetary transmissions having clutch springs is that actuation of the brake assembly to effect reverse drive continued the actuation of the clutch assembly. Accordingly, the clutch springs became overloaded due to excessive compression thereby creating undesirable wear requiring frequent repair or replacement. Moreover, the excessive compression of the clutch springs fed force back to the control lever making it undesirably difficult to pull from neutral to reverse position.

SUMMARY

The invention provides an improved and simplified control mechanism for a planetary transmission of the type including clutch springs. The control mechanism includes a control member mounted on the throwout bearing of the clutch assembly and connected by link members to a rigid frame. A control lever accessible to the operator is mounted on the control member for rotating the control member and thus shifting the same axially to disengage the clutch assembly and affect neutral drive. The control member is connected to the link members by lost-motion connections whereby continued rotation of the control member to effect reverse drive does not further compress the clutch springs to any significant extent. This feature provides the advantage of reducing the effort required to shift the transmission from neutral to reverse drive. Moreover, the clutch springs and associated components are not overstressed, resulting in longer periods of use before repair or replacement become necessary.

The control mechanism of the invention is characterized by simplicity of construction and operation. Conventionally, planetary gear type transmissions include a brake assembly for effecting reverse drive of the transmission. In the present invention the linkage for actuating the brake assembly is simple and effective and does not require frequent or precise adjustment.

Briefly, the objects of the invention are to provide a control mechanism for a planetary transmission which is characterized by: simple and relatively inexpensive construction; operability with a minimum of wear on the components of the transmission; and ease of operation for the operator.

DESCRIPTION OF THE PREFERRED EMBODIMENT

Figure 1:
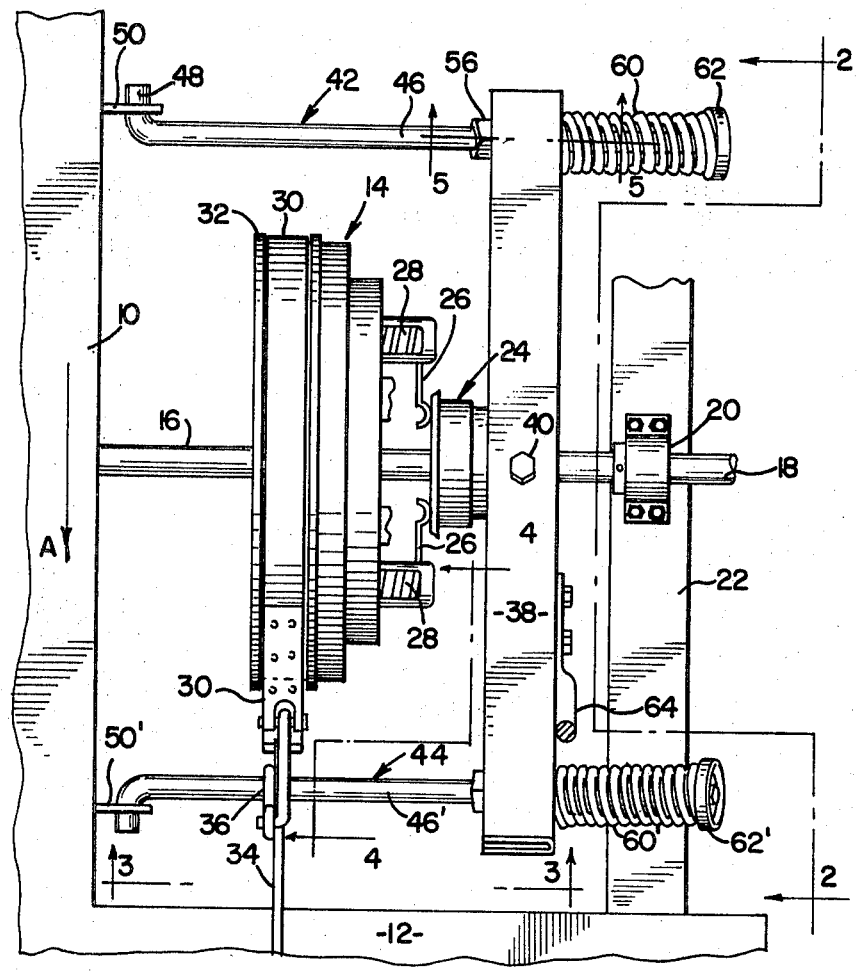
FIG. 1 is a fragmentary plan view of a planetary transmission for a vehicle and illustrating the improved control mechanism for the transmission.

Referring first to FIG. 1, there is shown a portion of a longitudinal frame member 10 and a transverse frame member 12 of a self-propelled windrower adapted for forward travel in the direction of arrow A. A planetary gear type transmission 14 is disposed adjacent to the frame members for driving a drive wheel (not shown) of the windrower through an output shaft 16. It will be understood that the windrower includes two such transmissions for driving respective drive wheels.

Power is supplied to the transmission 14 through an input shaft 18 journaled in a bearing 20 supported on a central frame member 22. The transmission 14 is of conventional design and thus includes a clutch assembly operable in engaged and disengaged positions for effecting forward and neutral drives, respectively. The transmission 14 further includes a brake assembly operable to effect reverse drive.

The clutch assembly includes a throwout bearing 24 slidably mounted on the input shaft 18 proximate to a plurality of circumferentially spaced, radially disposed clutch fingers 26 pivotally mounted on the clutch portion of the transmission unit. A plurality of circumferentially spaced springs 28 are arranged to normally bias the clutch assembly into an engaged position. The clutch fingers 26 and springs 28 are cooperatively arranged in conventional manner such that axial movement of the throwout bearing 24 against the clutch fingers 26 causes the clutch assembly to become disengaged against the force of the springs 28.

The transmission 14 also includes a brake assembly which includes an expandable and contractible brake band 30 disposed around the periphery of the transmission unit for effecting reverse drive. More specifically, the brake band 30 is disposed around that portion of the transmission referred to as the planet gear carrier (shown generally at 32) which rotates during forward and neutral drive but which must be held against rotation to effect reverse drive of the transmission. One end of the brake band 30 is secured to a bracket 34 which is rigidly mounted on the frame member 12 for anchoring the brake band so that the same may be expanded and contracted about the planet gear carrier 32 by a linkage system to be subsequently described. The other end of the brake band 30 is secured to a bellcrank 36 which is pivotally mounted on the bracket 34.

The control mechanism of the invention includes a control member 38 of channel shape mounted on the throwout bearing 24 by means of a vertical pin 40 so as to extend transversely of the input shaft 18. The mounting of the control member 38 on the throwout bearing 24 provides that the control member is rotatable about the axis of the shaft 18 as well as movable axially thereof conjointly with the bearing 24.

The ends of the control member 38 are adapted to be swingably coupled to the frame member 10 by means of link assemblies 42 and 44. The assemblies 42 and 44 are identical to each other and thus a description of one will suffice for both, with the identical parts being designated with the same reference numerals. As shown in FIG. 1, the link assembly 42 includes a rod 46 having a transverse end portion 48 which is pivotally mounted in a bracket 50 rigidly secured to the frame member 10.

Figures 4, 5:
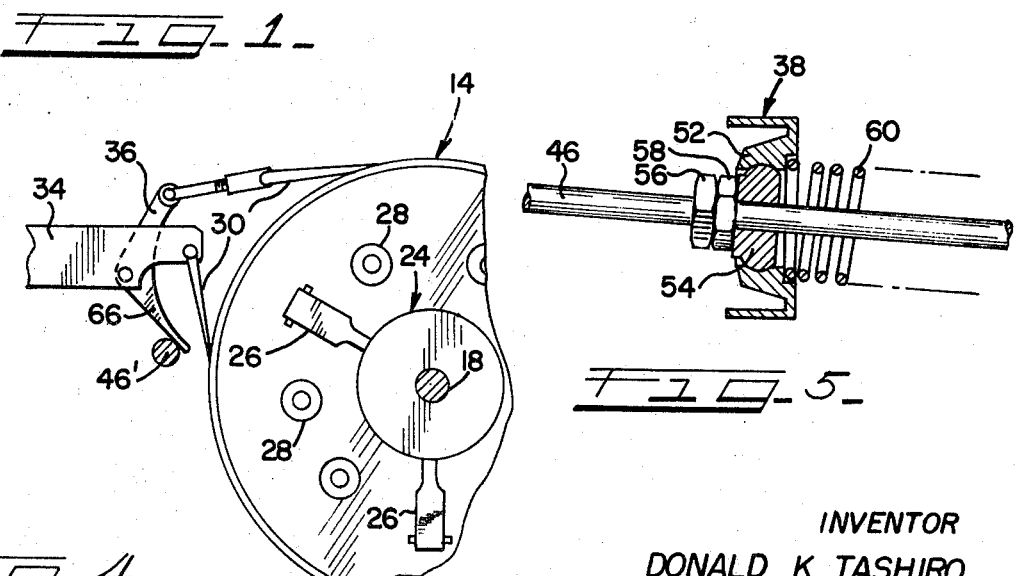
FIG. 4 is a fragmentary sectional view illustrating portions of the brake assembly of the transmission taken along line 4—4 of FIG. 1.
FIG. 5 is a fragmentary sectional view taken along line 5—5 of FIG. 1.

The control member 38 is swingably and slidably coupled to the rod 46 by a universal-type connection as best shown in FIG. 5. An annular socket 52 is formed in the control member 38 for receiving a ball member 54 which is slidably received on the rod 46. A pair of nuts 56 and 58 are threadedly mounted on the rod 46 to provide an abutment for the ball member 54. A coil spring 60 encircles the rod 46 and is interposed between the control member 38 and a cap 62 secured on the end of the rod 46 (FIGS. 1 and 3).

Figure 2:
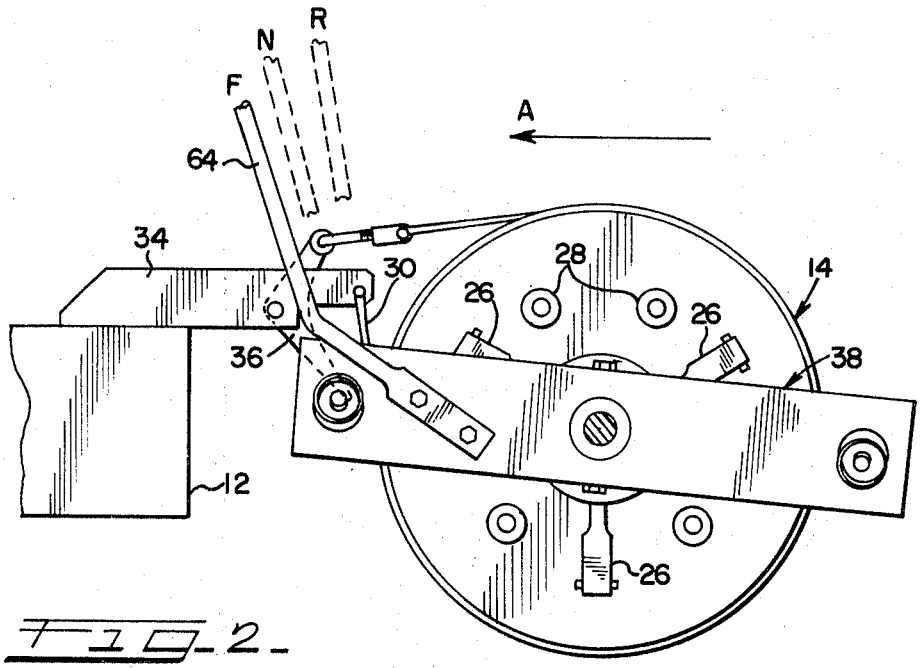
FIG. 2 is a fragmentary side elevation view of the transmission and the control mechanism taken generally along line 2—2 of FIG. 1.

The link assemblies 42 and 44 extend in generally parallel relation to each other and to the axis of the input shaft 18. Accordingly, rotation of the control member 38 about the axis of the shaft 18 causes the member 38 to shift axially. As best shown in FIG. 2, a lever 64 is mounted on the control member 38 and extends upwardly for access to an operator stationed above the level of the transmissions.

Figure 3:
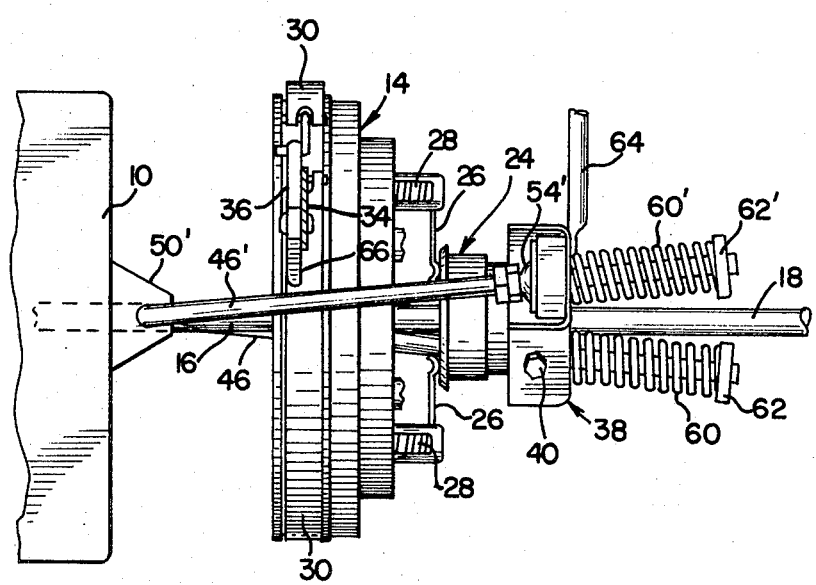
FIG. 3 is a fragmentary front elevation view of the transmission and control mechanism taken generally along line 3—3 of FIG. 1.

As best shown in FIGS. 3 and 4, the bellcrank 36 includes a leg portion 66 extending downwardly and rearwardly from the pivot connection of the bellcrank to the bracket 34. The rod 46' of the link assembly 44 extends beneath the leg portion 66 in position to engage the same upon upward swinging movement of the rod.

In operation, the input shaft 18 is driven by a suitable power train from the engine of the windrower. With the control lever 64 in the forward position as shown at F in FIG. 2, the transmission 14 will be in forward drive wherein the clutch assembly is engaged and the brake assembly is disengaged. To effect neutral drive, the lever 64 is pulled rearwardly to the neutral position shown at N to rotate the control member 38 about the axis of the shaft 18. Due to the connection of the link assemblies between the control member 38 and the frame 10, the rotation results in axial movement of the control member 38 and bearing 24 conjointly. The bearing 24 thus engages and pivots the clutch fingers 26 to disengage the clutch assembly against the force of the clutch springs 28. It will be understood that the capacity of the spring 60 and 60' is set to exert a force on the control member 38 which is substantially equal and opposite to the force of the clutch springs 28 exerted through the fingers 26 on the throwout bearing 24 and therefore on the control member 38 when the transmission is in neutral drive. The relationship of the rod 46' to the bellcrank 36 is such that the rod just engages the leg portion 66 when the transmission is in neutral drive.

To effect reverse drive, the lever 64 is pulled further rearwardly to the reverse position shown at R in FIG. 2. The consequent rotation of the control member 38 pivots the rod 46' upwardly and thus pivots the bellcrank 36 to tighten the brake band 30 about the periphery of the rotating planet gear carrier 32. The brake band 30 thus stops the rotation of the planet gear carrier effecting reverse drive of the transmission.

During the reversing step, the connections of the link assemblies 42 and 44 with the control member 38 serve as lost-motion connections preventing any significant amount of further axial movement of the throwout bearing 24 against the clutch fingers 26. This is provided by the sliding fit of the ball members 54 and 54' on the respective rods 46 and 46' wherein the rods continue to pivot and the control member remains stationary in the axial direction. The springs 60 and 60' are compressed to accommodate the relative axial movement of the nuts 56 and 58 away from the respective ball members which remain seated within the respective sockets of the control member. A beneficial result is that the fingers 26, springs 28, and associated components of the clutch assembly are not overloaded.

To go from reverse back to neutral drive, the lever 64 is simply pushed forwardly to the neutral position shown at N in FIG. 2. The consequent lowering of the rod 46' out of engagement with the bellcrank 36 permits the tight grip of the brake band 30 to be released. The planet gear carrier 32 is thus free to rotate. At the same time the rods 46 and 46' swing or pivot to again position the nuts against the respective ball members under the force of the expanding springs 60 and 60'.

Forward drive is effected by allowing the lever 64 to return to its forward position shown at F in FIG. 2. The consequent rotation of the control member 38 and the swing of the rods 46 and 46' pushes the control member and throwout bearing axially away from the clutch fingers 26. This engages the clutch assembly for forward drive.

From the foregoing it will be appreciated that the control mechanism of the present invention provides a simple and effective system for operating the associated transmission in forward-neutral-reverse drives.

What is claimed is:

1. A control mechanism for a planetary gear type transmission having a central shaft, a clutch assembly including a plurality of actuating fingers and clutch springs disposed about the shaft, a throw-out bearing slidably journaled on the shaft for movement thereon to depress the fingers to disengage the clutch assembly against the force of the springs, the transmission further including a brake assembly operable to incur reverse drive of the transmission, said control mechanism comprising:

a control member mounted on said throw-out bearing and extending transversely of said shaft for rotation about the axis of said shaft;

a rigid frame; and a pair of link assemblies connecting the opposite ends of said control member to said frame, said link assemblies extending generally parallel to said shaft so that rotation of said control member about said shaft moves the control member and throw-out bearing axially of said shaft to depress said fingers and disengage the clutch assembly against the force of said springs, said brake assembly including a portion disposed in the path of movement of one of said link assemblies so that continued rotation of said control member is effective to actuate said brake assembly for reversing the transmission.

2. The subject matter of claim 1, wherein each of said link assemblies is coupled to a respective end of said control member by means including a lost-motion connection whereby rotation of said control member to actuate said brake assembly is accomplished without an excessive amount of further axial movement of said throw-out bearing against said fingers.

3. The subject matter of claim 2, wherein each of said lost-motion connections includes resilient means acting against said control member in a direction opposite to and with a force substantially equal to the force of said clutch springs resisting further movement of said throw-out bearing.

4. The subject matter of claim 1, wherein said brake assembly includes a contractible band encircling said transmission and having one end fixed to said frame, a bellcrank pivotally mounted on said frame and having the other end of said band connected thereto, said bellcrank being disposed in the path of movement of said one of said link assemblies for pivoting movement when engaged thereby to tighten said band about the transmission.

5. A control mechanism for a planetary gear type transmission having a central shaft, a clutch assembly including a plurality of actuating fingers and clutch springs disposed about the shaft, a throw-out bearing slidably journaled on the shaft for movement thereon to depress the fingers to disengage the clutch assembly against the force of the springs, said control mechanism comprising:

a control member mounted on said throw-out bearing and extending transversely of said shaft for rotation about the axis of said shaft;

a rigid frame; and a pair of link assemblies connecting the opposite ends of said control member to said frame, said link assemblies being arranged so that rotation of said control member about said shaft moves the control member and throw-out bearing axially of said shaft to depress said fingers and disengage the clutch assembly against the force of said springs.

6. The subject matter of claim 5, wherein said link assemblies are coupled to said control member by means including lost-motion connections whereby axial movement of said bearing and said control member beyond that necessary to disengage the clutch assembly is significantly precluded.

References Cited
UNITED STATES PATENTS

| | | | |
|---|---|---|---|
| 466,158 | 12/1891 | Davis | 192—17 |
| 992,157 | 5/1911 | Bryant et al. | 74—792 |

BENJAMIN W. WYCHE, Primary Examiner

U.S. Cl. X.R.

192—99, 17; 74—103